United States Patent [19]
Maker

[11] 3,928,962
[45] Dec. 30, 1975

[54] FUEL CONTROL SYSTEMS FOR GAS TURBINE ENGINES
[75] Inventor: Paul Mainwaring Maker, Birmingham, England
[73] Assignee: Lucas Aerospace Limited, Birmingham, England
[22] Filed: Apr. 26, 1974
[21] Appl. No.: 465,142

[30] Foreign Application Priority Data
Apr. 27, 1973  United Kingdom............. 20027/73

[52] U.S. Cl............................................. 60/39.28 R
[51] Int. Cl.² ......................................... F02C 9/08
[58] Field of Search ............... 60/39.28 R, 39.28 T; 415/10, 15, 17, 30; 290/40 A; 322/29

[56] References Cited
UNITED STATES PATENTS

| 3,076,312 | 2/1963 | Haigh | 60/39.28 T |
| 3,098,356 | 7/1963 | Joline | 60/39.28 T |
| 3,295,316 | 1/1967 | Beatrice | 60/39.28 R |
| 3,357,177 | 12/1967 | Cornett | 60/39.28 R |
| 3,533,236 | 10/1970 | Cottington | 60/39.28 R |
| 3,546,598 | 12/1970 | McCauley | 60/39.28 R |
| 3,691,405 | 9/1972 | Kendell | 60/39.28 T |
| 3,747,340 | 7/1973 | Fenton | 60/39.28 T |
| 3,774,395 | 11/1973 | Greune | 60/39.28 T |

*Primary Examiner*—Clarence R. Gordon
*Attorney, Agent, or Firm*—Cushman, Darby & Cushman

[57] ABSTRACT

A fuel control system for a gas turbine engine includes means for producing an electrical signal corresponding to engine speed, means for producing an electrical signal corresponding to the desired engine speed, a first difference amplifier for producing an error signal corresponding to the difference between the desired and actual engine speeds, a limit circuit which imposes a variable limit on the magnitude of the error signal, an integrater connected to produce an output signal corresponding to the time integral of the output of the limit circuit, a second difference amplifier connected to compare the integrator output with the actual speed signal, an electrically actuated fuel flow control controlling fuel flow to the engine in accordance with the output of the second difference amplifier, said limit circuit being responsive only to the output of the second difference amplifier.

2 Claims, 1 Drawing Figure

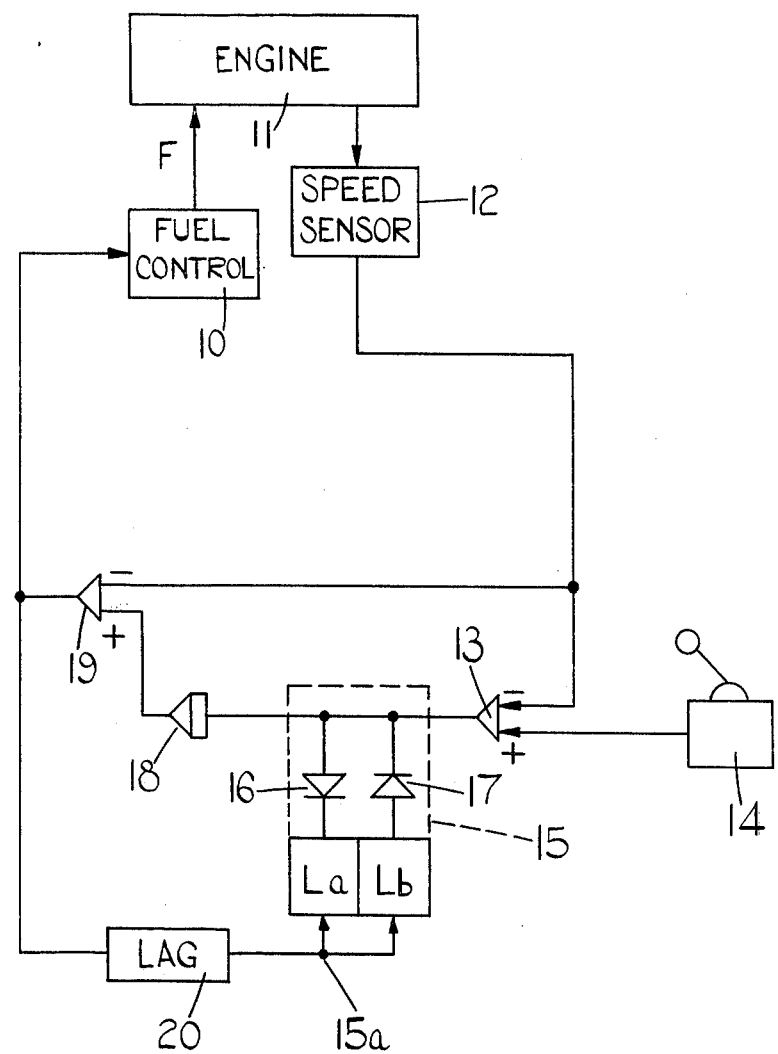

FUEL CONTROL SYSTEMS FOR GAS TURBINE ENGINES

It is known, e.g. from U.S. Pat. No. 3,076,312 to control the fuel flow to a gas turbine electronically utilising an integrator which integrates the difference between signals corresponding to the actual engine speed and the desired engine speed (with various multiplying factors included to account for changes in altitude and ambient temperature). With such a system it is conventional to set an upper limit on the difference signal during acceleration and a lower limit during decceleration so as to ensure that compressor stalling and flame extinction do not occur. In said prior U.S. Pat. No. 3,076,312 these upper and lower limits were set by a function generator in accordance with input signals corresponding to the actual engine speed and the intake air temperature.

This arrangement has not been found to be wholly satisfactory largely because of difficulties which arise in the measurement of the intake air temperature which is found to vary widely with the position of the sensing element used.

In accordance with the invention a fuel control system comprises means for producing an electrical signal corresponding to the actual engine speed, means for producing an electrical signal corresponding to the desired engine speed, a first difference amplifier connected to both of said means and arranged to produce an error signal corresponding to the difference between the desired and actual speeds, a limit circuit which imposes a variable limit on the magnitude of said error signal, an integrator connected to produce an output corresponding to the time integral of the output of the limit circuit, a second difference amplifier connected to compare the output of the integrator with the signal corresponding to the actual speed and an electrically actuated fuel flow control for controlling the fuel flow to the engine, in accordance with the output of the second difference amplifier, said limit circuit being responsive only to the output of the second difference amplifier.

An example of the invention is shown diagrammatically in the accompanying drawing.

The control system shown includes an electrically operated fuel flow control 10 which controls the rate at which fuel flows to the engine 11. This may be effected in a great many ways including variable speed fuel pumps, variable spill valves and variable metering valves, but the choice of any particular type of control 10 is not a part of the present invention.

Means 12 is provided for sensing the speed of the engine and producing an electrical output corresponding to the speed. Where the engine has several independently rotatable spools only one of these has its speed measured for the purposes of the present invention.

A first difference amplifier 13 is connected to compute the difference between the electrical signal produced by the speed sensor 12 and that produced by a pilots control 14 which is set to select the desired speed of the engine.

A limit circuit 15 of known form is connected to impose a limit on the error signal output of the amplifier 13. This circuit may comprise upper and lower limit signal generators $La$ and $Lb$ connected to the output terminal of amplifier 13 by oppositely arranged diodes 16, 17. The generator $La$ produces a signal of positive polarity and the generator $Lb$ produces a signal of negative polarity. The diodes 16, 17 are arranged so that when the output of amplifier 13 is less than the output of the generator $Lb$ (i.e. of negative polarity and greater magnitude than that of the output of the generator $Lb$) the output of the circuit 15 will be equal to the output of the circuit $Lb$. Similarly when the output of amplifier 13 is greater than the output of the circuit $La$ the output of the circuit 15 will be equal to that of circuit $La$. When the output of the amplifier 13 is between these values the output of circuit 15 will be that of the amplifier 13. The outputs of the circuits $La$ and $Lb$ depend only upon the input at a control terminal $15a$.

The output of the circuit 15 is connected to the input of an integrator 18 which performs a time integrating function in known manner. The output of the integrator 18 is connected to one terminal of a second difference amplifier 19 with another input from the speed sensor 12. The output of the second difference amplifier is connected both to the fuel flow control 10, and, via a lag circuit 20, to the control terminal $15a$ of the limit circuit 15.

In steady running conditions when the desired speed and the actual speed are equal there is no input to the integrator 18 which therefore produces a constant output signal. This acts as a datum signal for the difference amplifier 19 which serves the function of a speed governor for the engine. Thus minor fluctuations in the engine speed which have no significant effect on the integrator output are corrected by changes in the fuel flow brought about by the changes in the output of amplifier 19.

When the pilot moves his control lever 14, e.g. to accelerate the engine, an error signal will appear at the output of amplifier 13. This error signal, subject to the upper limit imposed thereon, is integrated by the integrator 18, thereby changing the speed datum signal applied to the amplifier 19. Thus the output of amplifier 19 is increased and the fuel flow is correspondingly increased, until a new equilibrium condition is achieved with the amplifier 13 producing no output and the output of amplifier 19 is appropriate to maintain the desired speed.

The actual signal produced by the integrator 18 in steady state conditions will, however, not always be the same for a given value of the engine speed. Thus, for a given fuel flow to the engine, the steady state speed will depend on several parameters such as ambient air pressure and ambient air temperature. Thus the signal produced by the amplifier 19 contains elements of information concerning these parameters which are precisely the parameters which are required to determine the acceleration and deceleration fuel margin limits.

Thus the controlling of the limit circuit only by the output of the amplifier 19 in fact involves controlling it in terms of the existing speed, and the parameters referred. The actual functions generated by the circuits $La$, $Lb$ are determined empirically for any given engine/fuel system combination.

The lag circuit 20 is intended to ensure that it is the steady state fuel flow existing before acceleration or deceleration commenced which controls the fuel margin and not the fuel flow after the acceleration or deceleration has commenced.

I claim:

1. A fuel control system for a gas turbine engine comprising means for producing an electrical signal corresponding to the actual engine speed, means for producing an electrical signal corresponding to the desired engine speed, a first difference amplifier connected to both of said means, and arranged to produce an error signal corresponding to the difference between the desired and actual speeds, a limit circuit which imposes a variable limit on the magnitude of said error signal, an integrator connected to produce an output corresponding to the time integral of the output of the limit circuit, a second difference amplifier connected to compare the output of the integrator with the signal corresponding to the actual speed and an electrically actuated fuel flow control for controlling the fuel flow to the engine, in accordance with the output of the second difference amplifier, said limit circuit being responsive only to the output of the second difference amplifier.

2. A fuel control system as claimed in Claim 1 in which said limit circuit has a control terminal the signal at which determines the limit imposed on the error signal, said control terminal being connected to the output terminal of the second difference amplifier by a lag circuit, which introduces a delay between a change in the output of the second difference amplifier and the corresponding change in the signal applied to the control terminal.

* * * * *